United States Patent
Kaelin et al.

[11] Patent Number: 6,079,833
[45] Date of Patent: Jun. 27, 2000

[54] LASER IMAGING USING A SPATIAL LIGHT MODULATOR

[75] Inventors: Barney J. Kaelin, Playa del Rey; Stephen J. Reinsch, Escondido, both of Calif.

[73] Assignee: Hughes-JVC Technology Corporation, Carlsbad, Calif.

[21] Appl. No.: 09/251,643

[22] Filed: Feb. 17, 1999

[51] Int. Cl.$^7$ ................................................. G03B 21/00
[52] U.S. Cl. ............................. 353/31; 353/122; 349/25; 345/32
[58] Field of Search ................................ 353/31, 33, 34, 353/37, 122; 349/25, 61; 345/32, 135, 16

[56] References Cited

U.S. PATENT DOCUMENTS

| | | |
|---|---|---|
| 4,343,535 | 8/1982 | Bleha, Jr. . |
| 4,650,286 | 3/1987 | Koda et al. . |
| 5,398,082 | 3/1995 | Henderson et al. ........................ 353/31 |
| 5,428,467 | 6/1995 | Schmidt . |
| 5,465,174 | 11/1995 | Sprotbery . |
| 5,521,748 | 5/1996 | Sarraf . |
| 5,700,076 | 12/1997 | Minich et al. . |
| 5,704,700 | 1/1998 | Kappel et al. ............................ 353/31 |
| 5,847,400 | 12/1998 | Kain et al. ............................... 356/445 |

Primary Examiner—Safet Metjahic
Assistant Examiner—Khaled Brown
Attorney, Agent, or Firm—Harness, Dickey & Pierce, P.L.C.

[57] ABSTRACT

An image projection system is provided for generating an energy efficient output representative of a desired input image. The image projection system includes a light source positioning device for directing the light from a light source onto a spatial light modulator. An image source provides the desired image to the spatial light modulator and also image information to a light source position controller for coordinating the light source positioning device, such that the light from the light source impinges substantially only the area of the spatial light modulator which contains the desired image. In particular, the controller actuates the light source positioning device by using a predefined scan that corresponds to the desired image. The spatial light modulator modulates the light with the desired input image and generates an output representative of the desired image. A beam brush may also be used for changing the width of the projection beam from light source, thereby improving image resolution and maximizing energy conservation.

34 Claims, 7 Drawing Sheets

LASER IMAGING USING A SPATIAL LIGHT MODULATOR

BACKGROUND OF THE INVENTION

1. Technical Field

This invention relates to an image projection system and, more particularly, to an image projection system that generates an energy efficient image by selectively directing projection light onto a spatial light modulator.

2. Discussion of Related Art

Image projection system for projecting images onto a remote viewing area are generally known. Early versions of these image projection systems utilized relatively low intensity light sources for providing a projection light which is in turn used to project an image formed on its spatial light modulator to a distance viewing area. The resulting image displayed in the viewing area was large enough to be viewed by a group gathered within a relatively dark viewing area. However, the displayed image was often washed out by ambient light in brighter viewing environments, thereby limiting the usefulness of these image projection systems.

To overcome the problems associated with bright viewing environments, high intensity light sources were used in the image projection systems to generate the necessary projection light for displaying an image. While these image projection systems produced a displayed image which could be seen in bright ambient light conditions, the use of these light sources remained somewhat inefficient and costly. In these conventional image projection systems, a spatial light modulator was entirely flooded by its light source (typically an arc lamp) and then modulated with the desired image. The spatial light modulator, working with the polarizers normally found in such systems, effectively blocks the light from the light source in non-image areas while passing light in the desired image areas. Thus, these image projection systems inefficiently used the projection light from its light source since much of its energy does not produce the resultant displayed image. Therefore, it is desirable to provide a high resolution and energy efficient image projection system.

SUMMARY OF THE INVENTION

In accordance with the teachings of the preferred embodiment, an image projection system is provided for generating an energy efficient output representative of a desired input image. The image projection system includes a light source positioning device for directing the light from a light source onto a spatial light modulator. An image source provides the desired image to the spatial light modulator and also image information to a light source position controller for coordinating the light source positioning device, such that the light from the light source impinges substantially only the area of the spatial light modulator which contains the desired image.

The image projection system of the present invention better utilizes its light source by directing light only to the area on the spatial light modulator which contains the desired image. Using narrow angle light sources, such as lasers, helps to give a tremendous depth of field when compared to a normal arc lamp. In addition, the present invention reduces laser speckles as well as eliminates off state leakage by the spatial light modulator.

BRIEF DESCRIPTION OF THE DRAWINGS

Other objects and advantages of the present invention will be apparent to those skilled in the art upon reading the following detailed description and upon reference to the drawings in which.

DETAILED DESCRIPTION OF THE PREFERRED EMBODIMENT

While the invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

Figure 1:
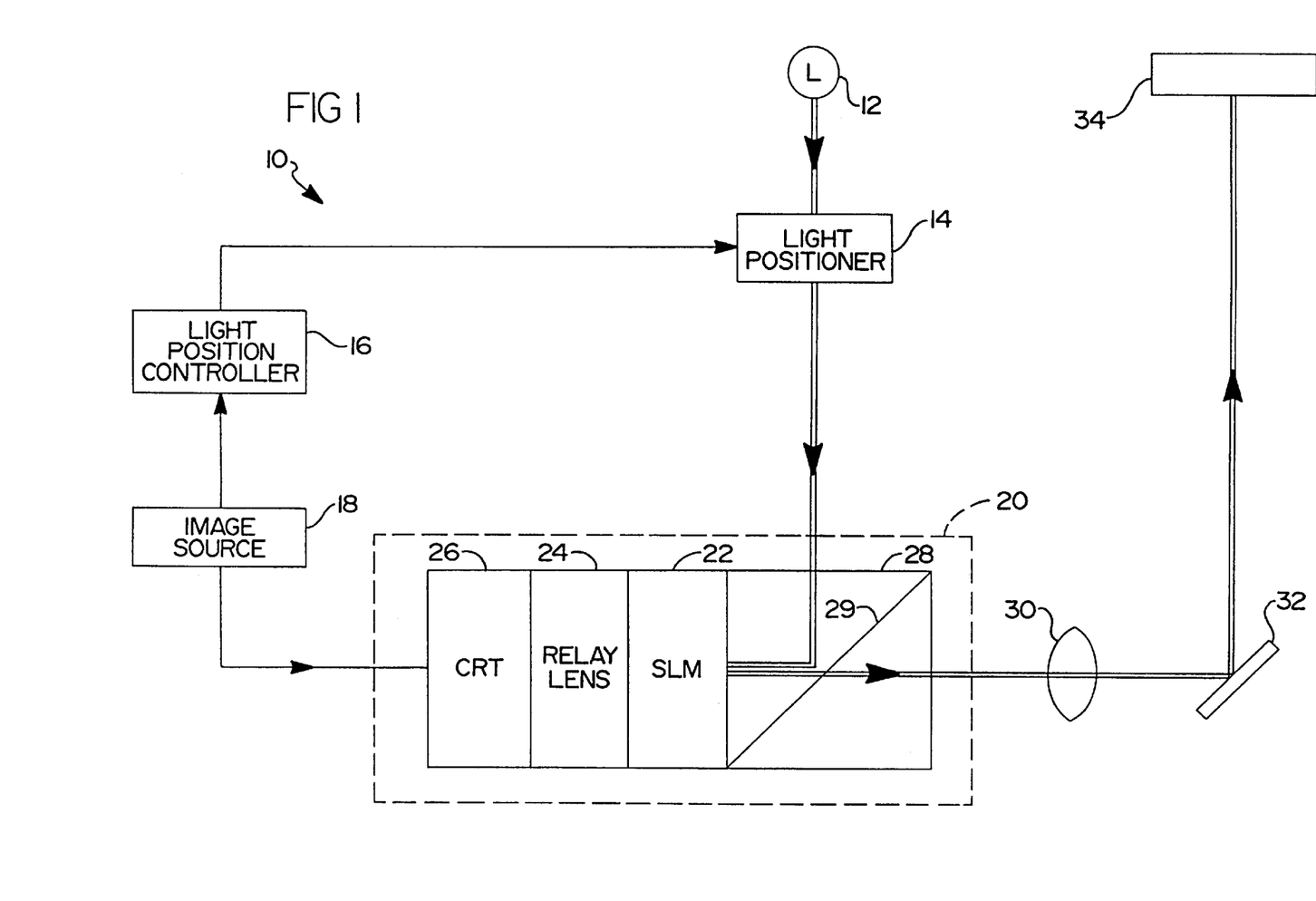
FIG. 1 is a block diagram showing an image projection system of the preferred embodiment of the present invention.

An image projection system 10 for generating an energy efficient image is depicted in FIG. 1. Image projection system 10 includes a light source 12, a light source positioning device 14, a light source position controller 16, an image source 18 and a spatial light modulator system 20. Light source positioning device 14 directs the light from light source 12 to spatial light modulator system 20. Image source 18 provides the desired image to system 20 and simultaneously provides image information to controller 16 for coordinating light source positioning device 14, such that the light from light source 12 impinges substantially only the area of spatial light modulator system 20 which contains the desired image.

Light source 12 (preferably a laser) is used to produce a narrow, intense input beam for impinging on spatial light modulator system 20. It is also envisioned that other light sources (e.g., Xenon arc lamp) may be used in the present invention. In the latter case, various optics may be used to shape or focus the light which impinges on spatial light modulator system 20. Light source positioning device 14 is positioned in the path of light source 12 for directing its projection beam onto spatial light modulator system 20. Light source positioning device 14 is preferably at least two G Series Open Loop galvanometers or an acusto-optic scanner.

Image source 18 (e.g., a VCR or laser disk player) provides image information about the desired input image to controller 16 and spatial light modulator system 20. Light source position controller (or image processor) 16 may be a digital signal processor or a general purpose computer which can be used to actuate light source positioning device 14 in relation to the desired image on spatial light modulator system 20. Spatial light modulator system 20 then modulates the projection light with the desired image, thereby generating an output representative of the desired image.

Spatial light modulator system 20 is generally comprised of a spatial light modulator 22, a relay lens 24, and a cathode ray tube (CRT) 26. The desired image is supplied to spatial light modulator system 20 by image source 18 which is connected to CRT 26. The image generated by CRT 26 is in turn transferred by relay lens 24 to spatial light modulator 22. Spatial light modulator 22 is preferably a reflective photoelectric light valve, such as the Model M30h Image Light Amplifier liquid crystal light valve manufactured by Hughes-JVC Technology Corporation of Carlsbad, Calif. Various other types of spatial light modulators fall within the scope of the present invention, including other reflective or transmissive spatial light modulators. The projection light from light source 12 acts as a reading light for spatial light modulator 22, whereas a writing light forming the desired image on spatial light modulator 22 is provided by CRT 26. Spatial light modulator system 20 further includes a polarizing beam splitter 28 having a polarizing reflective surface 29 for polarizing and redirecting the projection light from source 12 onto spatial light modulator 22. As will be apparent to one skilled in the art, other configurations for the spatial light modulator system 20 may be employed within the scope of the present invention.

An output image from spatial light modulator system 20 can be viewed in focus at great distance (e.g., easily 200 feet or more). A projection lens subsystem 30 is optionally disposed in the path of the output image for projecting the image to a remote viewing area 34. To direct the output image to different viewing areas, an actuable mirror and other reflective surfaces 32 can also be positioned in the path of the output image.

Figure 2A:
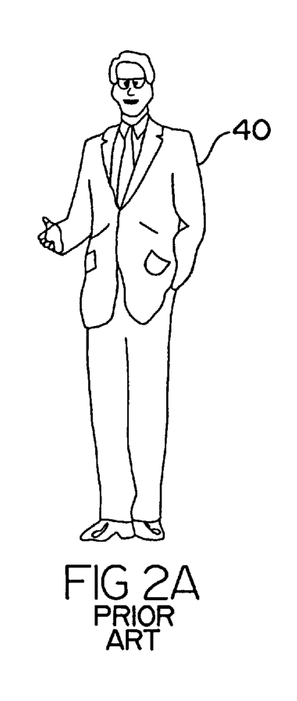
FIGS. 2A–2D illustrate how a conventional image projection system generates an output representative of the desired input image.
Figure 2B:
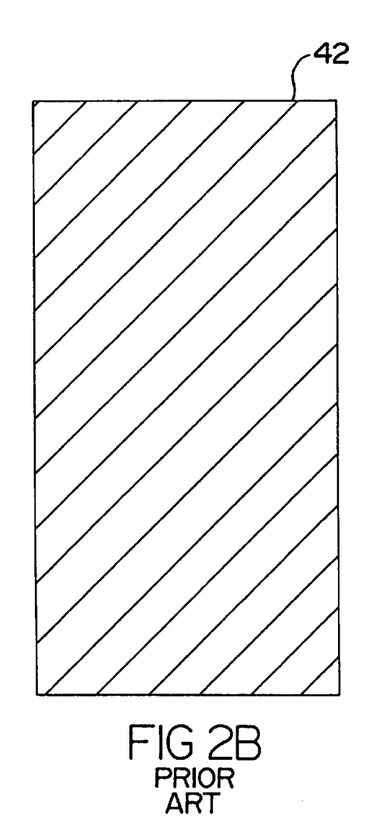
Figure 2C:
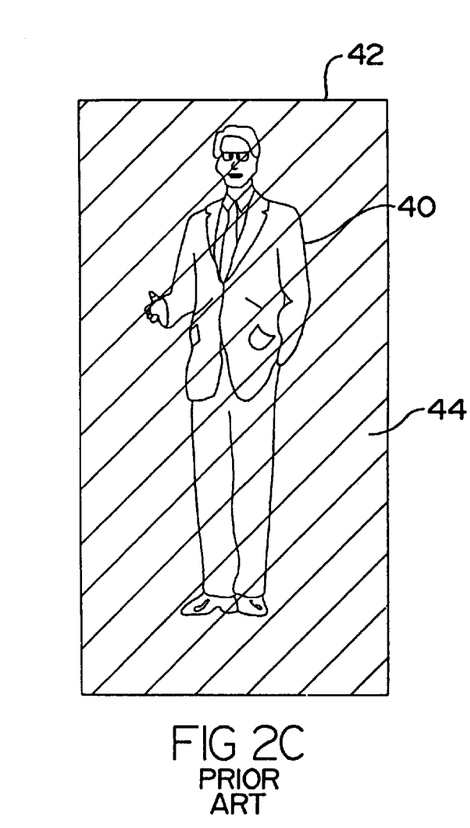
Figure 2D:
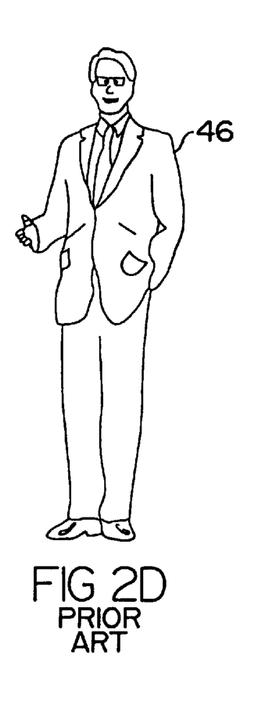

FIGS. 2A–2D illustrate the operation of a conventional image projection system. A CRT provides a writing light image, such as the man 40 shown in FIG. 2A, onto a spatial light modulator. To project this image, light is flooded entirely onto one side of the spatial light modulator 42 as seen in FIG. 2B. FIG. 2C illustrates how the light impinges on the entire surface area of the spatial light modulator, including the area 44 which does not contain the desired image. Referring to FIG. 2D, a projected image 46 representative of the man is the output from the spatial light modulator. As can be seen, the energy of the light source in area 44 is blocked by the spatial light modulator and thus is not used to generate the resultant image 46. Image projection systems of this type are described in several U.S. Patents, including U.S. Pat. No. 4,650,286 to Koda for Liquid Crystal Light Valve Color Projectors and U.S. Pat. No. 4,343,535 to Bleha, Jr. for Liquid Crystal Light Valve, which are incorporated herein by reference.

Figure 3A:
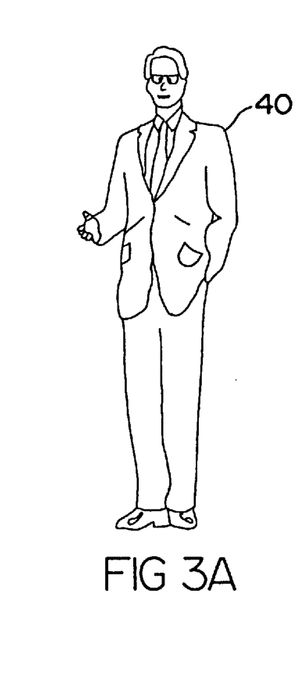
FIGS. 3A–3D illustrate how the image projection system of the present invention generates an energy efficient output representative of the desired input image.
Figure 3B:
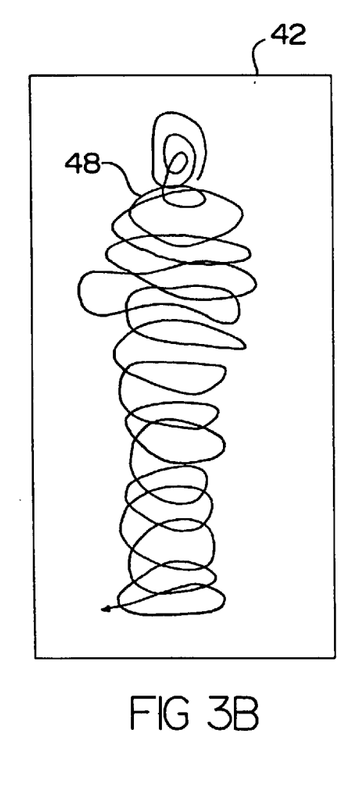

Although similar in operation to these conventional image projection systems, image projection system 10 of the present invention better utilizes its light source by directing light only to the area on the spatial light modulator which contains the desired image, such as image 40 of FIG. 3A. By using light source positioning device 14, light from light source 12 is directed towards spatial light modulator system 20, such that light impinges substantially only on the area of the spatial light modulator 22 associated with the desired image. For instance, laser light from source 12 is scanned onto the spatial light modulator 22 only onto the area which substantially correlates to the image area of the man provided by the CRT 26. In that case, controller 16 coordinates light source positioning device 14 to produce the path for the projection light as shown in FIG. 3B at 48.

Figure 3C:
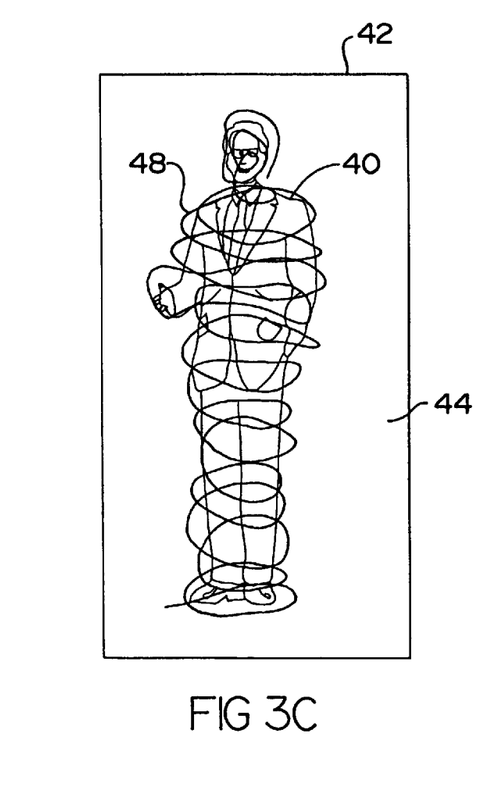
Figure 3D:
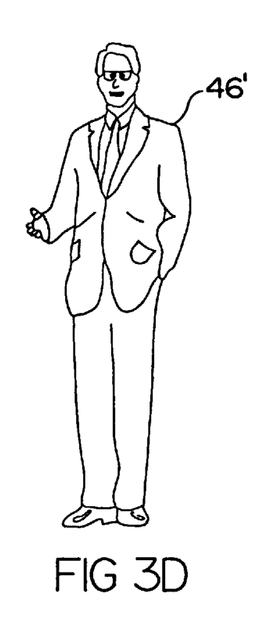

Generally, this path does not precisely follow the CRT scan, however a beat pattern may form if scanning is performed too far out of phase or at an incorrect relative speed. Referring to FIG. 3C, light 48 impinges substantially only on the area of the spatial light modulator 22 which contains the image of the man 40 and not in area 44. Spatial light modulator 22 is also modulated by image source 18 to further trim the output image. FIG. 3D shows a more defined and energy efficient output image 46' as produced by image projection system 10 of the present invention.

For a simple still image, an approximate path for the projection light can be manually created and stored using controller 16. It is envisioned that for these types of images, spatial light modulator 22 may be replaced with a reflective or transmission slide of the desired image. However, for more complex images and/or video input signals, image/laser coordination is typically performed using techniques common in the area of animation. When a video signal is used to drive spatial light modulator 22, then the path must fill the image from top to bottom to approximately follow the on state area of spatial light modulator 22 as it scans down the video picture.

Figure 4:
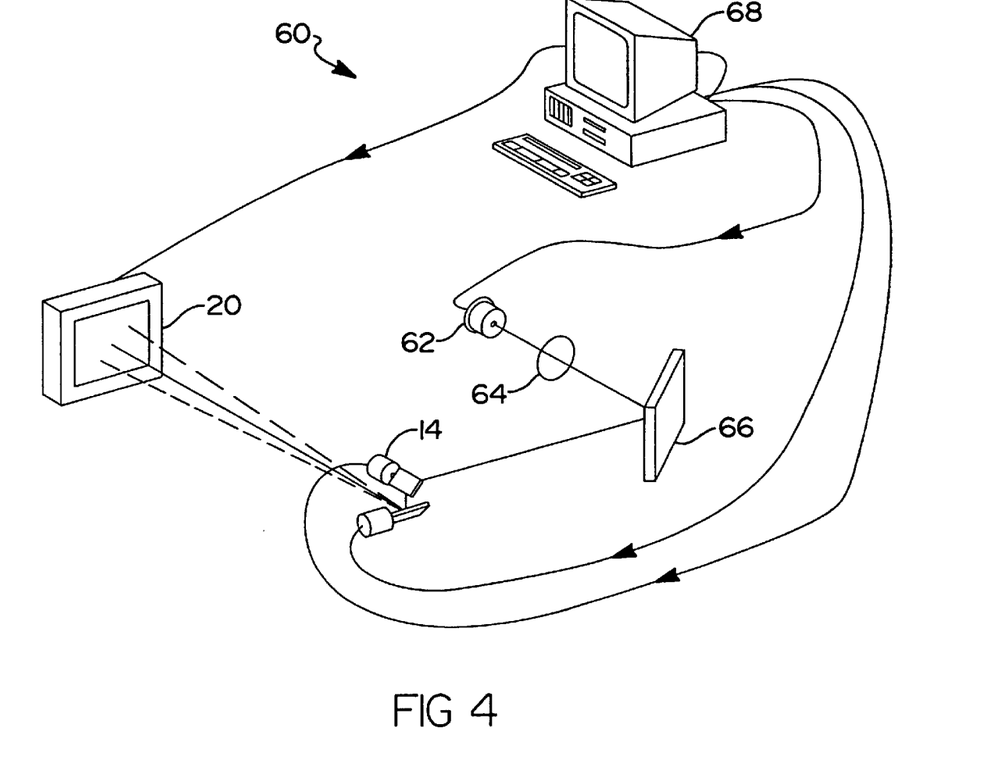
FIG. 4 is a diagram showing a first embodiment of the image projection system of the present invention.

In accordance with the present invention, a first embodiment of an image projection system 60 is depicted in FIG. 4. In this particular configuration, a 15 milliwatt red laser diode is used for light source 62 with a lens 64 optionally positioned in the path of the diode for focusing it onto light source positioning device 14. A mirror 66 or other reflective optics may be used to direct the projection beam towards light source positioning device 14. In this embodiment, a general purpose computer 68 serves as both controller 16 and image source 18 of FIG. 1. Thus, computer 68 can provide image information to spatial light modulator system 20 while coordinating the input to light source positioning device 14.

Figure 5:
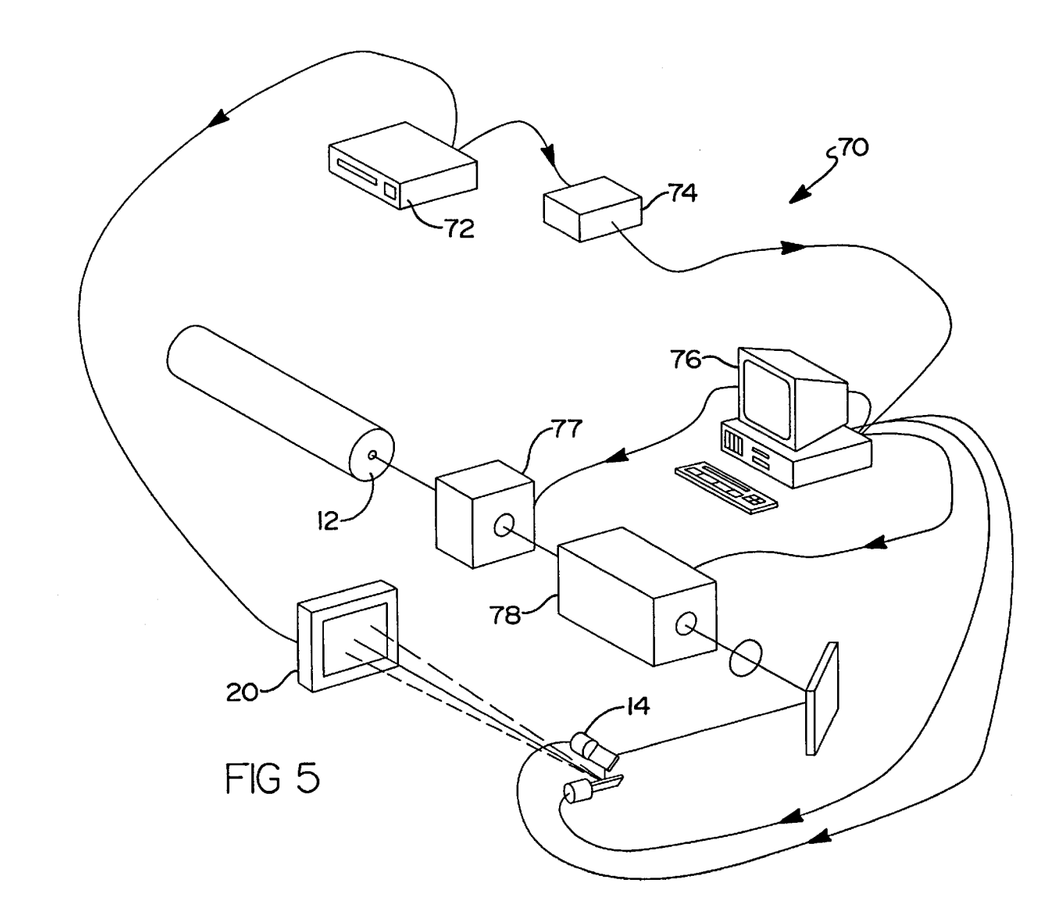
FIG. 5 is a diagram showing a second embodiment of the image projection system of the present invention.

A second embodiment of an image projection system 70 is shown in FIG. 5. Spatial light modulator 20 is modulated with a video signal from an image source 72 (e.g., a laser disk player) which in turn is connected via a time code box 74 to general computer 76. General purpose computer 76 acts as the light source position controller for the system, and thus receives references (i.e., time codes) from time code box 74 for performing proper image/laser coordination. For instance, a reference code may indicate an upcoming movement in the desired image (e.g., a man begins waving his hand) and in response the computer 76 will use a scan that corresponds to the desired image of the man waving his hand to coordinate the light source positioning device 14.

A laser intensity modulator 77 and/or beam brush 78 may optionally be positioned in the projection path of light source 12. Laser intensity modulator 77 can be used to prevent off state leakage in the output image by shutting off light as the projection beam moves across a portion of spatial light modulator 22 that has no image. As shown, laser intensity modulator 77 can be controlled by the general computer 76. For simple image applications where a laser diode light source can be quickly switched off and on, laser intensity modulator 77 may not be needed. Beam brush 78 may also be used to change the shape of the projection beam from light source 12. Although a beam brush 78 may also not be needed for a simple course image, it can be used to provide greater detailed output images and/or to maximize energy conservation of light source 12.

Figure 6A:
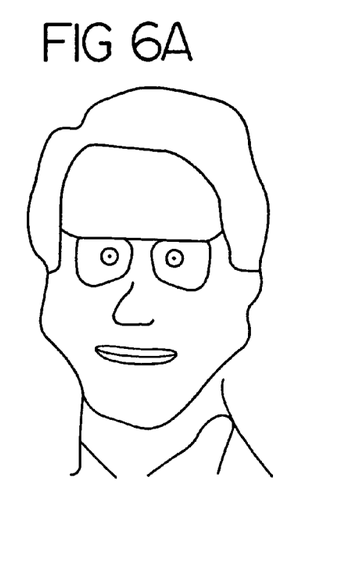
FIGS. 6A–6D illustrate how a beam brush may be used to generate a scan for use by the image projection system of the present invention.
Figure 6B:
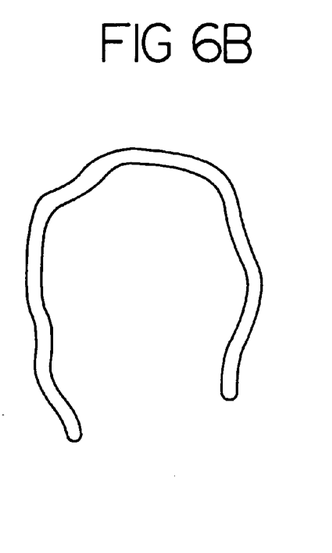
Figure 6C:
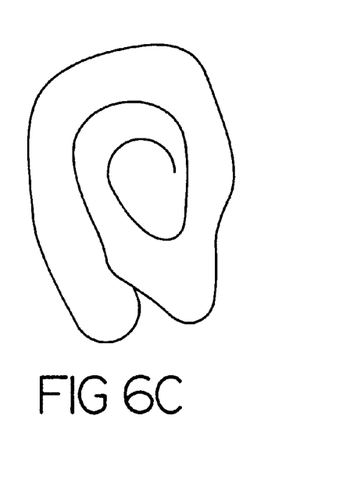
Figure 6D:
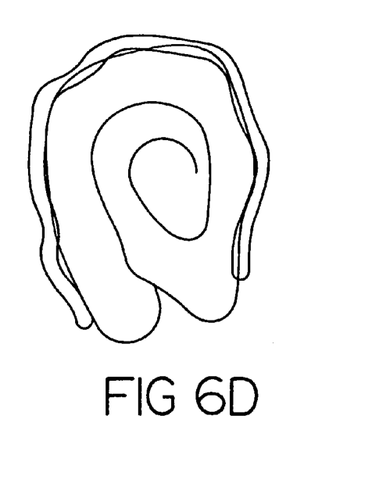

FIGS. 6A–6D illustrate how beam brush 78 may be used by image projection system 70. FIG. 6A shows the face of a man as being the desired image on spatial light modulator system 20. A small diameter beam is used in FIG. 6B to outline the desired image. In FIG. 6C, a larger diameter beam can then be used to more quickly and accurately fill in the outline of the image. The resulting path for the scan, as shown in FIG. 6D, corresponds to the desired image of the man's face. It should be noted that the intensity (per area) of the light source changes when the beam size is changed by beam brush 78. Accordingly, the brightness of the beam increases when the beam diameter is small and decreases when the beam diameter is large. As will be apparent to one skilled in the art, the beam scan speed can be increased when the beam diameter is small and decreased when the beam diameter is large to make the intensity of the output image appear to be constant. It is also envisioned that the beam brush 78 may use a beam shape other than round (i.e., a sharp or feathered edge beam) when scanning the image.

Figure 7A:
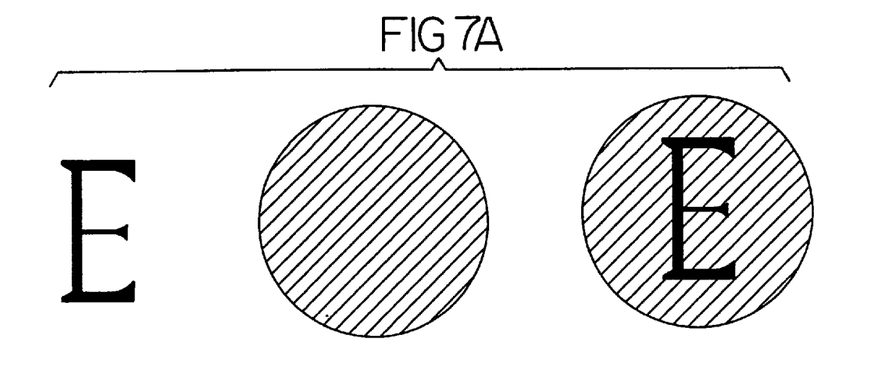
FIGS. 7A–7C contrast the energy efficiency of the image projection system of the present invention with a conventional image projection system.
Figure 7B:
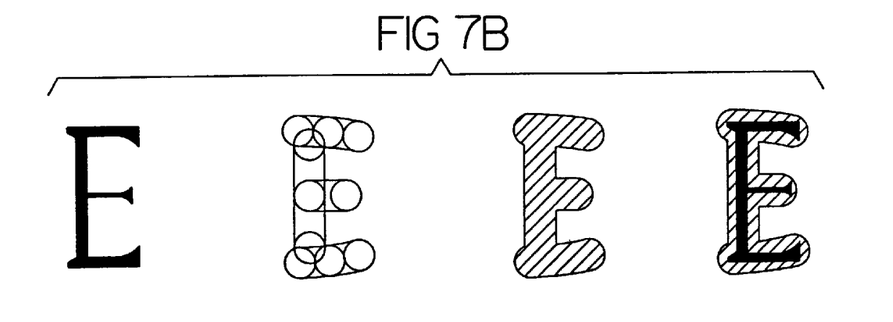
Figure 7C:
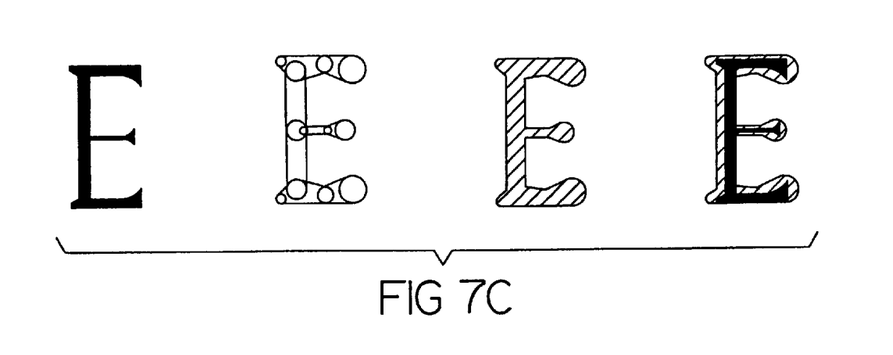

Lastly, the energy efficiency of each of the above described embodiments are contrasted with a conventional image projection system in FIGS. 7A–7C. In each of these Figures the character "E" is the desired image being placed on the system's spatial light modulator. As shown in FIG. 7A, the spatial light modulator of a conventional system is flooded by the light from its light source. As a result, more than 95% of the projected light is wasted on the non-image areas of the spatial light modulator. In contrast, an image projection system 10 of the present invention only directs the projection beam to the area where the image is located on its spatial light modulator. The approximate beam path in relation to the desired character is shown in FIG. 7B. By only slightly "over scanning" the image area on the spatial light modulator, an image projection system 10 of the present invention (without a beam brush) significantly reduces the amount of wasted light from its light source. Moreover, FIG. 7C illustrates that by incorporating a beam brush, such as beam brush 78, to vary the size of the beam, an alternative embodiment of the present invention is able to further minimize the amount of wasted light from its light source.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

What is claimed is:

1. An image projection system for generating an energy efficient output image, comprising:
    a light source;
    a spatial light modulator;
    a light source positioning device for directing the light from said light source onto said spatial light modulator;
    a light source position controller for controlling said light source positioning device; and
    an image source for providing a desired image, said image source providing image information to said spatial light modulator and also to said light source positioning controller, such that the light from said light source impinges substantially only an area of said spatial light modulator which contains the desired image;
    a light shaping device positioned in the path of said light source for transiently shaping the light from said light source, said light source position controller coordinating said light shaping device and said light source positioning device with respect to the desired image, and said light source position controller generating a first light path, having a light beam with a first diameter, for outlining the desired image, and a second light path, having a light beam with a second diameter, for filing in an outline of the desired image.

2. The image projection system of claim 1 wherein said light source positioning device scans the light from said light source onto said spatial light modulator.

3. The image projection system of claim 1 wherein said spatial light modulator includes a liquid crystal light valve having a first surface illuminated by said image source and a second surface having selected areas illuminated by said light source.

4. The image projection system of claim 1 wherein said light source is a laser light source.

5. The image projection system of claim 1 wherein said spatial light modulator includes a writing means for generating the desired image, a spatial light modulator device for modulating the desired image with the light from said light source, and a relay lens disposed between said writing means and said modulator device for optically transferring the desired image from said writing means to said modulator device.

6. The image projection system of claim 5 wherein said writing means is a cathode ray tube device.

7. The image projection system of claim 1 wherein said spatial light modulator is at least one of a reflective photoelectric modulated light valve and a transmissive photoelectric modulated light valve.

8. The image projection system of claim 1 wherein said spatial light modulator is a reflective slide or a transmissive slide.

9. The image projection system of claim 1 wherein said light source positioning device is a galvanometer scanner or an acusto-optic scanner.

10. The image projection system of claim 1 further including at least one reflective member positioned in the path of an output image from said spatial light modulator for directing the output image to a remote viewing area.

11. The image projection system of claim 1 further including a projection lens subsystem positioned in the path of an output image from said spatial light modulator for projecting the output image to a remote viewing area.

12. The image projection system of claim 1 further including a light switching device positioned in the path of said light source for selectively transmitting the light to said light source positioning device, said light source positioning controller coordinating said switching device with respect to the desired image.

13. The image projection system of claim 1 wherein said light source positioning controller coordinates said means for shaping light with said light source positioning device to control the speed of at least one of said first light path and said second light path, thereby maintaining a substantially constant intensity for the projected image.

14. An image projection system for producing an energy efficient output image, said system comprising:
    a laser light source for generating a projection beam;
    a spatial light modulator system for generating an output image, said spatial light modulator system having an image surface;
    a beam positioning device for directing the projection beam from said light source onto a desired image formed on said image surface of said spatial light modulator system;
    an image source for providing an input image to said spatial light modulator system, said desired image being a designated area of the input image which has been selected as a portion of the input image formed on the image surface to be scanned by the laser light source, said desired image covering an area of the spatial light modulator which is less than the total area of the image surface of the spatial light modulator;
    an image processor connected to said image source and said beam positioning device, said image processor receiving image information associated with said input image for coordinating said beam positioning device, such that the projection beam impinges substantially only on an area of said spatial light modulator system which contains said input image, thereby producing the energy efficient output image; and
    a light shaping device positioned in the path of said light source for transiently shaping the light from said light source, said image processor coordinating said light shaping device and said beam positioning device with respect to the input image, and said image processor generating a first light path, having a light beam with a first diameter, for outlining the input image, and a second light path, having a light beam with a second diameter, for filling in an outline of the input image.

15. The image projection system of claim 14 wherein said beam positioning device scans the light from said light source onto said spatial light modulator.

16. The image projection system of claim 14 wherein said spatial light modulator system includes a liquid crystal light valve having a first surface illuminated by the image source and a second surface having selected areas illuminated by said light source.

17. The image projection system of claim 14 wherein said spatial light modulator system includes a writing means for generating the input image, a spatial light modulator for modulating the input image with the projection beam, and a relay lens disposed between said spatial light modulator and said writing means for optically transferring the input image from said writing means to said spatial light modulator.

18. The image projection system of claim 17 wherein said writing means is a cathode ray tube device.

19. The image projection system of claim 17 wherein said spatial light modulator is a reflective photoelectric modulated light valve or a transmissive photoelectric modulated light valve.

20. The image projection system of claim 14 wherein said spatial light modulator system is a reflective slide or a transmissive slide.

21. The image projection system of claim 14 wherein said beam positioning device is an acusto-optic scanner or two galvanometer scanners.

22. The image projection system of claim 14 further including a light modulator positioned in the path of said light source for selectively transmitting the light to said beam positioning device, said image processor coordinating said light modulator with respect to the input image.

23. The image projection system of claim 14 wherein said image processor coordinates said means for shaping light with said beam positioning device to control the speed of at least one of said first light path and said second light path, thereby maintaining a substantially constant intensity for the output image.

24. A method for generating an energy efficient output image using an image projection system, comprising the steps of:

providing a desired input image to a spatial light modulator, said spatial light modulator having an image surface, and said desired input image covering an area of the spatial light modulator which is less than the total area of the image surface of the spatial light modulator;

directing light from a light source onto said spatial light modulator using a light source positioning device, such that the light from said light source impinges substantially only the area of said spatial light modulator which contains the desired image;

modulating the light from said light source using said spatial light modulator, thereby generating an energy efficient output image;

shaping the light from said light source using a light shaping device disposed in the path of the light from said light source; and coordinating said light shaping device and said light source positioning device for generating a first beam path with the light having a first diameter beam for outlining the image and a second beam path with the light having a second diameter beam for filing in the outline of the desired image.

25. The method of claim 24 wherein the step of directing light further comprises scanning the light from said light source onto said spatial light modulator using a light source positioning device.

26. The method of claim 25 wherein the step of directing light further comprises controlling said light source positioning device using a light source position controller, said controller receiving image information from an image source.

27. The method of claim 25 wherein the step of modulating light further comprises illuminating a first surface of said spatial light modulator with the desired image from an image source and selectively illuminating a second surface of said spatial light modulator with the light from said light source.

28. The method of claim 24 further including the step of transiently shaping the light from said light source by using a beam brush disposed in the path of the light from said light source.

29. The method of claim 24 further including the step of controlling the scan speed of at least one of said first beam and said second beam, thereby maintaining the intensity of the output beam.

30. An projection system for generating an output image, comprising:

a light source;

a spatial light modulator;

a light source positioning device for directing the light from said light source onto said spatial light modulator;

a light source position controller for controlling said light source positioning device;

an image source for providing image information to said spatial light modulator, wherein light from said light source impinges substantially only an area of said spatial light modulator which contains the image information; and a light shaping device, positioned in the path of said light source, for transiently shaping the light from said light source, said light source positioning controller coordinating said light shaping device and said light source positioning device with respect to the desired image, wherein said light source positioning controller generates a first light path, having a light beam with a first diameter, for outlining the desired image, and a second light path, having a light beam with a second diameter, for filling in an outline of the desired image.

31. The projection system of claim 30 wherein said light shaping device is a beam brush device.

32. The image projection system of claim 1 wherein the light source is an arc lamp.

33. The image projection system of claim 1 wherein the light source is a xenon arc lamp.

34. The image projection system of claim 1 further including at least one actuable mirror positioned in the path of an output image from said spatial light modulator for moving the output image around a remote viewing area.

* * * * *